July 20, 1965

R. C. PARRISH 3,195,934

COUPLING FOR FLUID CONDUITS

Filed May 31, 1962

INVENTOR.
REUEL C. PARRISH

BY
Dunlap, Laney & Hubbard
ATTORNEY

July 20, 1965  R. C. PARRISH  3,195,934
COUPLING FOR FLUID CONDUITS

Filed May 31, 1962 2 Sheets-Sheet 2

INVENTOR.
REUEL C. PARRISH
BY
*Dunlap, Laney & Hubbard*
ATTORNEYS

3,195,934
COUPLING FOR FLUID CONDUITS
Reuel C. Parrish, P.O. Box 861, Enid, Okla.
Filed May 31, 1962, Ser. No. 198,893
4 Claims. (Cl. 285—312)

The present invention relates to conduit couplings and more particularly, but not by way of limitation, relates to improvements in conduit couplings of the type which can be quickly connected and disconnected.

As is well-known in the art, various types of fluid conduit couplings which can be quickly connected and disconnected by hand have been devised and are presently in extensive use. One prevalent type of coupling employs a tubular female member, known in the art as a coupler, which has an annular seat disposed therein, which seat faces toward the open end of the coupler. A tubular male member, known in the art as an adapter, is adapted to be received in the open end of the coupler and has an annular seat formed on one end thereof. When the adapter is inserted in the coupler, the two seats are mated to form an annular fluid-tight seal between the two tubular members. Of course, when the adapter and coupler are connected to the ends of two joints of conduit by any suitable conventional means, a continuous, leak-proof fluid conduit is provided.

The adapter may be forced into the coupler to firmly mate the two seats by any one of several types of mechanical advantage devices which usually comprise some type of a lever or cam means. Perhaps the most common type of cam means for mechanically interconnecting the coupler and the adapter, as well as for urging the seat on the adapter into firm contact with the seat within the coupler, is comprised of one or more cams which are pivotally connected to the coupler and coact with an annular concave groove in the outer wall of the adapter. In this type of coupling device, the cam means are pivotally connected directly to the coupler and therefore to the seat within the coupler. The cams then extend through apertures or slots in the wall of the coupler to engage the annular groove formed on the adapter. One of the two seats, usually the seat formed within the coupler, is fabricated of a resilient material and is compressed by the other of the seats when the adapter is forced downwardly into the coupler by pivotation of the cam means.

The operation of this type of coupling device, and in particular the operation of the pivoted cam means, is dependent upon the resiliency of the seat. The resilient seat must be compressed in order to permit the cam means to be pivoted and urge the adapter into the coupler. This type of coupling device and resilient seal operate in a very satisfactory manner so long as the resilient seat is fabricated of a material capable of withstanding any adverse heat or chemical effects of the liquid being handled by the conduit. However, all economically feasible, resilient materials presently available for forming the resilient seat in the coupler are subject to destruction or rapid deterioration at all but the most moderate operating temperatures, and many of the sealing materials are susceptible to the deleterious effects of various strong chemicals. For these reasons, this general type of quick connect-disconnect coupling has been limited in its application to use in handling fluids which are at moderate temperatures or which have no highly destructive chemical properties, and cannot be used for coupling conduits which handle either hot or cold fluids or some types of strong chemicals.

Therefore, it is contemplated by the present invention to provide a new and improved construction for a quick connect-disconnect coupling of the general type described which is not dependent upon the resiliency of the seal for operation of the cam means and for effective sealing between the two seats, and which therefore can employ either a metal-to-metal seal or a slightly resilient seat such as asbestos, if desired. In the broader aspects of the preferred embodiment of this invention, the coupling is comprised of first and second seat members each having a seat formed thereon which when mated form an annular, fluid-tight seal. A cam support means is slidably associated with either of the seat members and at least one cam means is pivotally connected to the cam support means. A means, such as an annular concave groove, is provided on one of the seat members for coacting with the pivoted cam means to exert a bias force on the cam support means upon pivotation of the cam means. A spring means is also provided for transmitting the bias force exerted on the cam support means, by pivotation of the cam means, from the cam support means to the other of the seat members. Therefore, when the two seat members are positioned so as to mate the seats and the cam means is pivoted, the resulting force will be transmitted from one of the seat members through the cam means to the cam support means, and from the cam support means through the spring means to the other of the seat members. The two seat members are thereby forced together and the seats thereon are firmly mated to form a fluid-tight seal. As mentioned, this construction permits the elimination of the previously used resilient seat so that, if desired, two completely non-resilient or substantially incompressible seats may be employed, such as, for example, two metal seats.

Therefore it is an important object of the present invention to provide an improved coupling device of the type described which may employ two contacting metal or otherwise incompressible seats to provide an annular fluid seal between the coupling members.

Another object of the present invention is to provide a coupling device of the type described which is adapted to handle fluids either at very high or very low temperatures, and which is adapted to better withstand the deleterious effects of some chemicals which corrode and otherwise destroy presently available resilient materials from which resilient seats may be fabricated.

Still another object of the present invention is to provide a coupling device of the type described which can embody either two non-resilient seating surfaces, two resilient seating surfaces, or a combination of a resilient and a non-resilient seating surface, as required and desired.

A further object of the present invention is to provide a fluid conduit coupling device of the type described having the objects and advantages set forth which provides a strong mechanical connection between two fluid conduits.

Still another object of the present invention is to provide a fluid conduit coupling device of the type described which is sturdy and will withstand severe and prolonged usage and which can be economically manufactured.

Many additional objects and advantages will be evident to those skilled in the art from a reading of the following detailed description and a perusal of the reference drawings, which, taken in conjunction with the appended claims, comprise a disclosure of a preferred embodiment of the present invention.

Figure 1:
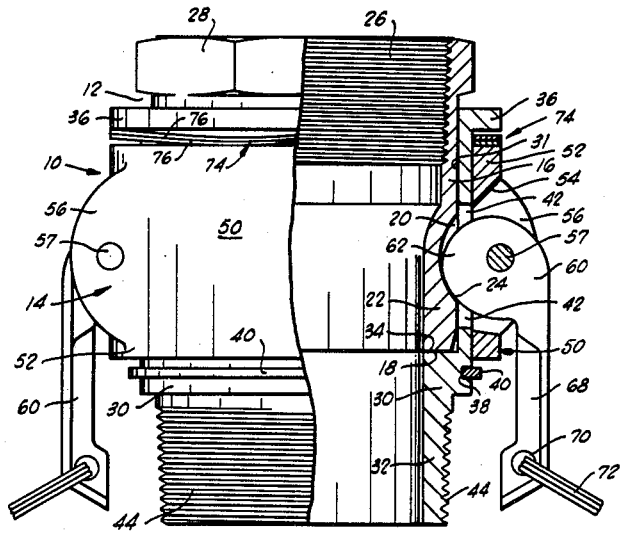
FIG. 1 is a side view of a coupling device constructed in accordance with the present invention, the device being shown partially in section to better illustrate details of construction.
Figure 2:
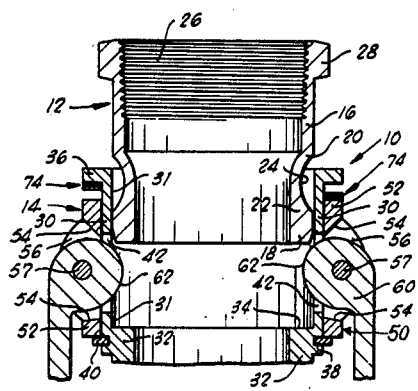
FIG. 2 is a sectional view taken along the longitudinal axis of the coupling device of FIG. 1 with the two seat members disconnected and serves to illustrate the operation of the device.
Figure 3:
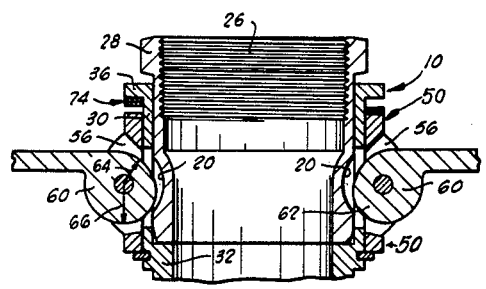
FIG. 3 is a cross sectional view taken along the longitudinal axis of the device of FIG. 1 and also serves to illustrate the operation of the device.

Referring now to the drawings, and in particular to FIGS. 1, 2 and 3, a fluid conduit coupling device constructed in accordance with the present invention is indicated generally by the reference numeral 10. The coupling device 10 is comprised of two tubular seat members indicated generally by the reference numerals 12 and 14, respectively, as can best be seen in FIG. 2. The tubular seat member 12 may be considered the male member of the coupling device 10, and is known in the art as an adapter. According, the seat member 12 will hereafter be referred to as an adapter. The seat member 14 may be considered the female member of the coupling device and is commonly referred to in the art as a coupler. Accordingly, the seat member 14 will hereafter be referred to as a coupler.

The adapter 12 is comprised of a tubular adapter sleeve 16 preferably having a sectional configuration substantially as shown in the drawings. The adapter sleeve 16 has an annular seating surface or seat 18 formed on the end thereof which is received in the coupler 14, as can best be seen in FIG. 2. An annular concave groove 20 is formed in the outer surface of the adapter sleeve 16. It will be noted that the annular groove 20 is so positioned on the adapter sleeve 16 as to be receivable within the coupler 14. The adapter sleeve 16 may have a thickened portion in the general region 22 to provide a sufficient thickness of metal to form the anular groove 20, and in particular to reinforce the adapter sleeve 16 between the shoulder 24 formed by the annular groove 20 and the annular seat 18.

Any suitable, conventional means is provided at the end of the adapter sleeve 16 opposite the end forming the seating surface 18 for connecting the adapter 12 to any conventional fluid conduit (not shown). As illustrated in the drawings, the means for coupling the adapter 12 to a fluid conduit comprises conventional female threads 26 cut in the internal wall of the adapter sleeve 16. The outer circumference of the adapter sleeve 16 may be of larger diameter and machined to form a conventional octagonal circumference 28 for facilitating the use of a wrench when connecting the adapter 12 to a desired fluid conduit. It is to be understood that in place of the female threads 26, the adapter 12 may be provided with a tubular shank (not shown) having external or male threads thereon, or a shank having annular ridges for insertion into a flexible hose conduit, as may be desired, for connecting the adapter 12 to a fluid conduit (not shown).

The female seat member or coupler 14 is comprised of a second tubular sleeve 30. A portion 31 of the coupler sleeve 30 has an internal diameter dimensioned to receive the adapter sleeve 16, as best seen in FIG. 2. The tubular coupling sleeve 30 also has a portion 32 of lesser diameter to form an annular shoulder or seating surface 34, also best seen in FIG. 2. As will be noted from FIG. 1, the annular seating surface 34 is preferably of the same width as the thickness of the adapter sleeve 16 in the region 22 so as to provide a passageway through the coupling device 10 of generally constant diameter to reduce turbulence. Of course, when metal-to-metal seal is desired for purposes hereafter described, the annular seating surface 34 is machined to mate with the annular seating surface 18 formed on the end of the adapter sleeve 16. These mating seating surfaces 18 and 34 will normally be planer as illustrated, but, as will be evident to those skilled in the art, could have any suitable form. However, it will be noted that since both the adapter sleeve 16 and coupler sleeve 30 are fabricated of metal, the mating surfaces 18 and 34 can be formed on the adapter and coupler, respectively, to provide a metal-to-metal, fluid-tight seal, when properly mated without requiring additional seat-forming components unless so desired. It will also be evident to those skilled in the art that the seating surfaces 18 and 34 may be coated with a ceramic or other incompressible synthetic resin coating especially adapted to protect the metal from the corrosive effects of various fluid chemicals which it may be desired to handle.

The coupler sleeve 30 has an annular flange 36 formed around the outer periphery of the end which receives the adapter 12. An annular groove 38 is provided around the periphery of the coupler for receiving a spring clip 40 which serves as a stop-means as hereafter described in greater detail. The coupler sleeve 30 also has two apertures 42 (only one of which is shown in FIG. 1) for passing pivoted cam means hereafter described. The apertures 42 are disposed on opposite sides of the tubular coupler sleeve 30 and are positioned a distance above the annular seating surface 34 so as to align generally with the annualr groove 20 in the adapter sleeve 16 when the annular seating surface 18 on the adapter is abutting the annular seating surfaces 34 on the coupler, as shown in FIGS. 1 and 3.

One end of the coupler sleeve 30 is provided with external or male threads 44 for connecting the coupler 14 to a fluid conduit. Of course, it is to be understood that any suitable conventional coupling means could be provided for connecting the coupler 14 to a fluid conduit. For example, internal or female threads could be provided in the sleeve, or the sleeve could be provided with annular ridges for insertion into a flexible hose conduit, as previously described in connection with the adapter 12.

A cam support bracket indicated generally by the reference numeral 50 is comprised of a third bracket sleeve 52 which is slidably disposed around the larger diameter portion 31 of the coupler sleeve 30, substantially as shown in FIG. 1. The sleeve 52 has a length, or longitudinal dimension, slightly less than the distance between the annular groove 38 and the annular flange 36, for purposes hereafter described in greater detail. The sleeve 52 has a pair of apertures or slots 54 which are positioned to register with the apertures 42 in the coupler sleeve 30. A pair of radial flanges 56 extend along the longitudinal edges of each of the apertures 54 to form trunnions for pivot pins 57. The pivot pins 57 may extend through aligned bores in the radial flanges 56.

A pair of identical cam levers, each indicated by the reference numeral 60, are pivotally connected to the cam support bracket 50 by the pivot pins 57. Each cam lever 60 is comprised of an arcuate cam surface 62. The arcuate cam surface 62 has, in general, a minimum radius 64, when considered about the axis of the pivot pin 57 and a progressively increasing radius to a maximum radius 66, substantially as illustrated in FIG. 3. The exact curvature and mode of operation of the cam lever 60 is generally well-known in the art and therefore will not be described in greater detail. The cam lever 60 may have an elongated lever portion 68 having an aperture 70 into which a ring 72 is inserted to facilitate pivotation of the cam lever by a single finger. The dimensions of the cam surface 62 are such as to pass through the respective aperture 42 in the coupler sleeve 30 and engage the concave annular groove 20 in the adapter 12 as hereafter described in greater detail. Of course, the apertures 42 and 54 in hte coupler sleeve 30 and cam support bracket sleeve 52, respectively, are sufficiently large as to permit the necessary pivotation of the cam lever 60, as will be hereafter described.

Figure 4:
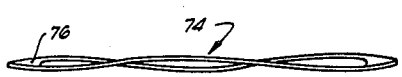
FIG. 4 is a side view of the spring means used in the coupling device of FIG. 1.

A suitable spring means, indicated generally by the reference numeral 74, is so disposed as to act to bias the annular flange 36 and the adjacent end of the cam support bracket sleeve 52 apart. The annular spring means 74 preferably comprises one or more relatively thin washers 76 (two being shown) fabricated from a suitable spring steel. The annular washers 76 are each warped substantially as shown in FIG. 4 and provides a spring force which resists compression of the washer into a single plane. Any number of the washers 76 may be employed depending upon the magnitude of the spring force required, as hereafter described in greater detail.

Figure 5:
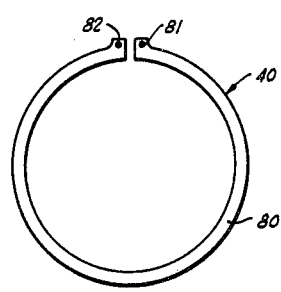
FIG. 5 is a plan view of a spring clip stop means which is used in the coupling device of FIG. 1.

The spring clip 40 previously referred to is received in the annular groove 38 cut in the outer periphery of the sleeve 30, and serves as a stop-means to prevent the cam support bracket 50 from sliding off the tubular coupler sleeve 30. The length of the cam support bracket sleeve 52 is preferably so dimensioned with respect to the distance between the flange 36 and the spring clip 40 as to maintain the spring washers 76 under slight compression and thereby prevent loose play of the cam support bracket sleeve 52 when the adapter 12 is disengaged from the coupler 14. The spring clip 40 is formed substantially as shown in FIG. 5 and comprises a split washer 80 fabricated of spring steel and preferably is provided with apertures 81 and 82 for receiving a conventional spreading tool to assist in inserting the spring clip 40 in the annular groove 38, and of course the removal of the spring clip therefrom.

Figure 6:
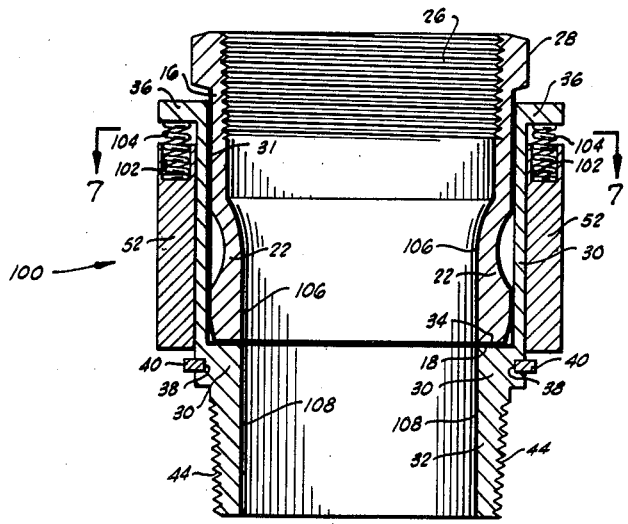
FIG. 6 is a sectional view taken along the longitudinal axis of a slightly modified coupling constructed in accordance with the present invention; and, FIG. 7 is a sectional view taken substantially on lines 7—7 of FIG. 6.
Figure 7:
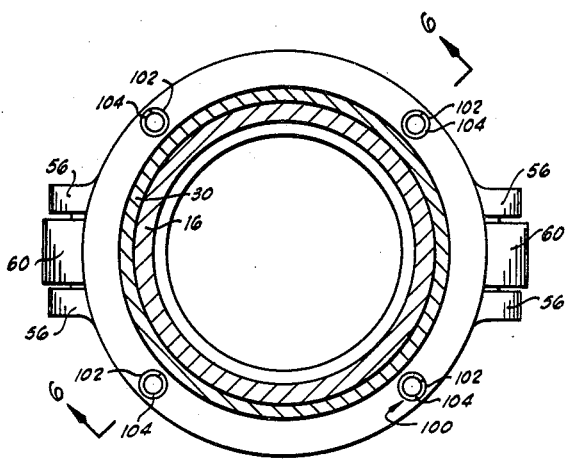

An alternatively constructed coupling, indicated generally by the reference numeral 100, is illustrated in FIGS. 6 and 7. The coupling 100 is identical in construction to the coupling 10 except as will presently be described, and accordingly all identical parts have been designated by the same reference numerals used to designate the corresponding parts of the coupling 10. The coupling 100 differs from the coupling 10 in that the spring washers 76 have been eliminated. In place of the washers, wells 102 are drilled in the upper end or edge of the cam support bracket sleeve 52 to receive four coil compression springs 104. The four compression springs 104 are preferably circumferentially spaced such that two springs are disposed on each side of the cam lever means 60. The compression springs engage the flange 36 of the coupler sleeve 30 and function in substantially the same manner as the spring washers 76, as hereafter described in detail. Therefore, in order to simplify the following explanation of the operation of the coupling devices 10 and 100, reference will be made only to the spring washers 76, it being understood that the device 100 has the same mode of operation. It will be apparent to those skilled in the art that the spring means comprised of the compression springs 104 and wells 102 provide a very economically constructed device. It will also be apparent to those skilled in the art that various other types of spring means may be utilized in accordance with the present invention, the scope of which is limited only by the appended claims.

The coupling device 100 is also illustrated as being provided with a suitable protective coating on the interior surfaces 106 and 108 of the adapter sleeve 16 and the coupler sleeve 30, respectively, as well as on the seating surfaces 18 and 34, the protective coating being represented by the thickened lines on these surfaces. The protective coating may be compressible or relatively incompressible, a ceramic, a synthetic resin such as a coal tar epoxy resin, or any other special chemical or abrasive resistant coating which may be practical for controlling a particular problem.

OPERATION

In order to utilize the coupling devices 10 or 100 to join two ends of a pair of fluid conduits, the adapter sleeve 16 is connected to one of the conduits by threading the female threads 26 onto male threads formed on the fluid conduit. Similarly, the coupler 14 is connected to the other conduit by threading the male threads 44 into a collar or other female threaded coupling means. When the adapter 12 is inserted in the coupler 14, substantially as shown in FIG. 2, it will be noted that the cam levers 60 must be pivoted upwardly to their maximum point in order to permit the adapter 12 to be fully inserted until the annular seating surfaces 18 and 34 abut as shown in FIG. 3.

When the adapter 12 has been inserted into the coupler 14 until the seating surfaces 18 and 34 are in abutting relationship, the cam surfaces 62 of the cam levers 60 will be positioned to enter the concave annular groove 20 in the adapter 12, substantially as illustrated in FIG. 3. Then, upon forced pivotation of the cam levers 60 until the elongated levers 68 are generally parallel with the axis of the coupler, as shown in FIG. 1, the increasing diameter of the cam surfaces 62 will wedge between the shoulder 24 formed by the groove 20 and the pivot pins 57. As the levers are pivoted further, an axial component of force will be applied to the pivot pins 57 and therefore to the cam lever support bracket 50. The bracket support 50 will be moved upwardly relative to the adapter 12, when referring to FIG. 1, and the spring washers 76 will be compressed between the end of the bracket support 50 and the flange 36. Therefore, the force of the spring means 74, comprised of a plurality of washers 76, will firmly urge the seating surface 18 on the coupler sleeve 30 into seating engagement with the seating surface 34 formed on the end of the adapter sleeve 16. This spring-loaded seating force securely engages the metal-to-metal seating surfaces 18 and 34, and yet also permits pivotation of the cam lever means 60 by permitting movement of the cam lever support bracket 50.

It will be evident to those skilled in the art that unless the pivot pin 57 of the cam lever 60 is permitted to move axially relative to the adapter 12 upon pivotation of the cam lever 60, the cam lever 60 could not be pivoted to mechanically couple the adapter and coupler together as well as maintain the two metal seating surfaces 34 and 18 in fluid-sealing engagement. However, some movement of the cams is required to compensate for normal irregularities during manufacture in the dimensions of the adapater and the coupler as well as wear of the cam surface 62 and the shoulder 24 formed by the annular groove 20. The spring means 74 serves this function in that it permits pivotation of the cam lever and yet continually urges the metal seating surfaces 34 and 18 into sealing engagement by a force which can be traced from the seating surface 18 on the adapter 12, to the shoulder 24 of the groove 20, to the cam surface 62, to the pivot pin 57, to the cam support bracket 50, to the spring washers 76, to the annular flange 36 on the coupler sleeve 30, and through the tubular coupler sleeve 30 back to the annular seating surface 34 on the coupler which abuts the annular seating surface 18 on the adapter.

As mentioned, the seating surfaces 18 and 34 are biased together with a force equal to the force of the spring washers 76. Of course, if a force exceeding the force of the spring washers 76 is applied to separate the adapter 12 and coupler 14, the seating surfaces 34 and 18 may be separated. However, it will be appreciated that the spring washers 76 can be made very strong individually, or a greater number of the spring washers 76 may be used to prevent separation of the seating surfaces 18 and 34. Increasing the force of the spring means 74 is practical because a relative great spring force can be overcome by the mechanical advantage of the cam lever means 60. Further, only a slight movement of the cam support bracket 50 is required for operativeness of the device, so that if necessary the curvature of the cam surface 62 may be altered from the curvature conventionally used to greatly increase the mechanical advantage which can be gained by the cam means so that the cam levers 60 can readily be pivoted by hand.

Of course, the close sliding fit between the adapter sleeve 16 and the coupler sleeve 30 provides great mechanical assistance in maintaining the seating surfaces 34 and 18 properly aligned and in abutting relationship and also greatly reduces the likelihood that the seating surfaces 18 and 34 will be separated during use of the coupling device 10.

Although a metal-to-metal seat has been disclosed in the preferred embodiment, it is to be understood that one of the prime advantages of the construction of the present invention is the provision of an alternative mode of operation in that either two metal, ceramic, or other substantially incompressible seating surfaces may be employed, or one of the seating surfaces, seating surface 34 for example, may be slightly compressible, or even both compressible and resilient. In this connection, an asbestos seating washer may be placed on the seating surface 34 and retained as required by any suitable means. The asbestos washer is slightly compressible but after repeated use may not be so resilient as to regain its original shape. Nevertheless, the operation of the spring washers 76 will continually supply a substantially uniform seating force tending to maintain the seating surface 18 on the adapter 12 firmly and uniformly pressed against the circumference of the asbestos washer. Of course, the asbestos washer has the ability to withstand extremes in temperatures so that hot tar or similar fluids may be handled without destruction of the seal between the adapter 12 and the coupler 14. Similarly, asbesos or metal seats also usually withstand lower temperatures than available resilient materials suitable for fabricating the types of seating surfaces under consideration. Ceramic, or other non-compressible seating surfaces may be required to withstand the corrosive effects of various chemicals.

Having thus described a preferred embodiment of the present invention, it will be evident to those skilled in the art that various changes and substitutions can be made therein without departing from the spirit and scope of the invention as defined by the appended claims.

What is claimed is:

1. A quick connect-disconnect coupling for fluid conduits comprising:
    a tubular coupler having an annular seating surface formed around the interior wall adjacent one end and radially outwardly extending abutment means secured to the exterior wall adjacent the other end;
    a tubular adapter receivable in the coupler at the end adjacent the abutment means and having an annular seating surface formed thereon for mating with the seating surface formed in the tubular coupler;
    an annular concave groove in the exterior wall of the adapter;
    a sleeve bracket slidably disposed around the coupler having one end thereof adjacent the abutment means;
    lever operated cam means pivotally connected to the sleeve bracket for coaction with the annular concave groove;
    aperture means in the tubular coupler for passing the cam means through the coupler for engagement with the annular concave groove;
    resilient means disposed between said abutment means and the end of the sleeve bracket adjacent thereto for transmitting a force exerted on the sleeve bracket to the tubular coupling,
    whereby upon insertion of the adapter into the coupler and pivotation of the lever operated cam means, the seating surfaces will be firmly pressed together by force transmitted from a side of the annular groove in the adapter through the cam means to the sleeve bracket, and from the sleeve bracket through the spring means to the annular flange around the exterior wall of the coupler.

2. A quick connect-disconnect coupling for fluid conduit as defined in claim 1 wherein:
    said resilient means comprises at least one warped, spring steel washer; and,
    further including a stop-means on the tubular coupler comprising an annular groove formed in the exterior wall of the tubular coupler, and a split ring clip disposed in the annular groove.

3. Apparatus as defined in claim 1 wherein said abutment means is formed integrally with said coupler.

4. A quick connect-disconnect coupling for fluid conduits comprising:
    a tubular coupler having an annular seating surface formed around the interior wall adjacent one end and an annular flange formed around the exterior wall adjacent the other end;
    a tubular adapter receivable in the coupler at the end adjacent the flange and having an annular seating surface formed thereon for mating with the seating surface formed in the tubular coupler;
    an annular concave groove in the exterior wall of the adapter;
    a sleeve bracket slidably disposed around the coupler having one end thereof adjacent the annular flange;
    lever operated cam means pivotally connected to the sleeve bracket for coaction with the annular concave groove;
    aperture means in the tubular coupler for passing the cam means through the coupler for engagement with the annular concave groove;
    spring means comprised of a plurality of wells in the end of the sleeve bracket adjacent the annular flange and a compression spring disposed in each of the wells for transmitting a force from the sleeve bracket to the annular flange,
    whereby upon insertion of the adapter into the coupler and pivotation of the lever operated cam means, the seating surfaces will be firmly pressed together by force transmitted from a side of the annular groove in the adapter through the cam means to the sleeve bracket, and from the sleeve bracket through the spring means to the annular flange around the exterior wall of the coupler.

References Cited by the Examiner

UNITED STATES PATENTS

| | | | |
|---|---|---|---|
| 964,310 | 7/10 | Perazio | 285—394 |
| 1,187,553 | 6/16 | Riordan | 285—313 X |
| 1,253,309 | 1/18 | Ulleland | 285—8 |
| 1,899,119 | 2/33 | Singer | 285—359 |
| 2,478,586 | 8/49 | Krapp | 285—312 |
| 2,641,490 | 6/53 | Krapp | 285—374 |
| 2,746,775 | 5/56 | Leonard | 285—317 X |
| 2,819,099 | 1/58 | Rittle | 285—291 X |
| 3,101,207 | 8/63 | Pavel | 285—29 |

CARL W. TOMLIN, *Primary Examiner.*